3,344,925
PLASTIC LINER FOR OIL FILTER
William A. Graham, 1385 Eckman Ave.,
Chula Vista, Calif. 92071
Filed Aug. 28, 1964, Ser. No. 392,827
2 Claims. (Cl. 210—312)

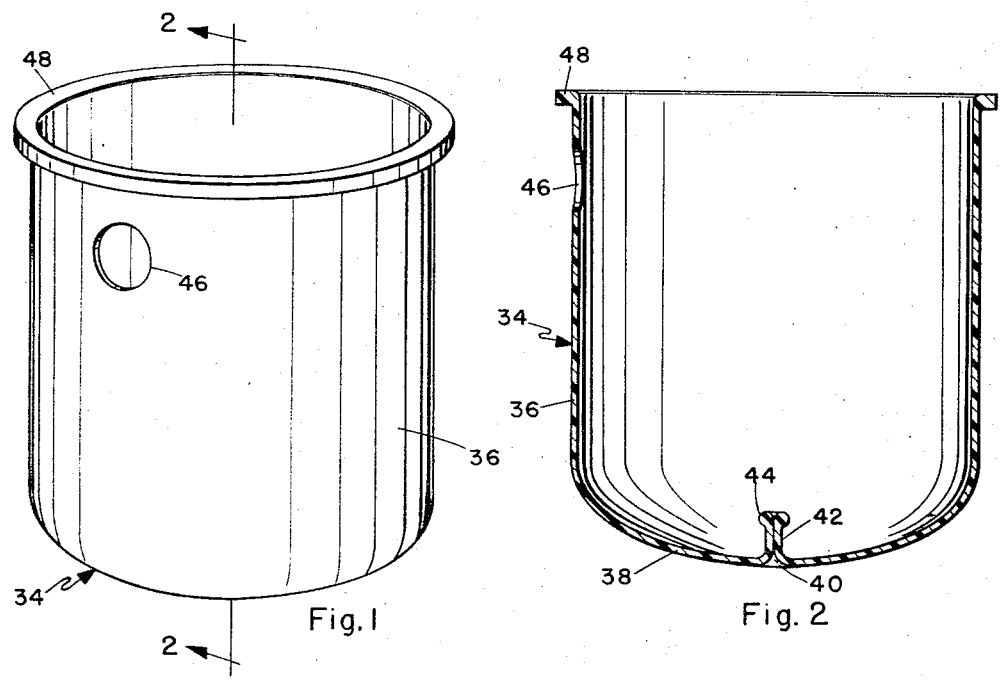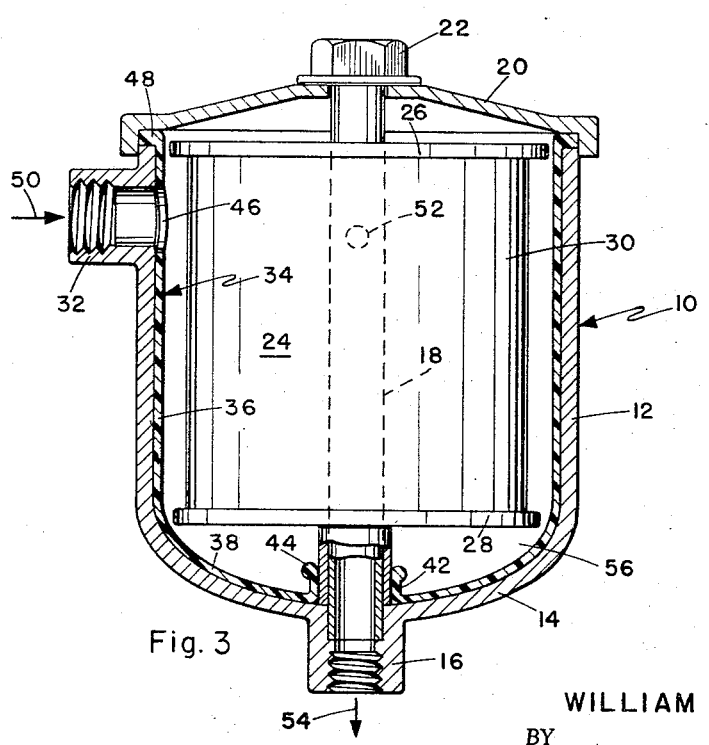
INVENTOR.
WILLIAM A. GRAHAM
BY
Knox & Knox

United States Patent Office 3,344,925
Patented Oct. 3, 1967

ABSTRACT OF THE DISCLOSURE

This is the combination with an oil filter cartridge and filter housing of a liner surrounding the sides and bottom of the filter cartridge and having an expansible, resilient neck tightly embracing the axial tube of the housing, the neck being resilient and self-closing so that it closes when withdrawn thus retaining the accumulated sludge.

---

The present invention relates generally to oil filters and more particularly to the type designed for filtering the crankcase oil of an internal combustion engine.

In lubricating systems for internal combustion engines, particularly those used for automobiles, it has long been common practice to use filtering means to remove sediment and foreign matter from the lubricating oil before it is circulated from the crankcase to the parts to be lubricated. One form of such filtering means consists of a housing in which is disposed a cartridge of foraminous material through which the oil flows and which filters out deletinous material. This filter cartridge becomes clogged over a period of time and must be removed and replaced with a fresh cartridge. Since the lower portion of the housing as well as the filter cartridge is usually filled with oily sludge, removal of this sludge from the housing is usually a messy operation at best. Many garagemen employ hand pumps to withdraw this sludge and then finish cleaning the housing by wiping the same with rags, but it is always regarded as a most undesirable job.

It is, accordingly, the primary object of this invention to provide an improved oil filter assembly for internal combustion engines in which the filter cartridge is combined and enclosed in a filter housing liner which is removed with the cartridge and which will receive and contain any oil and sludge which ordinarily collects in the filter housing and which otherwise must be withdrawn by a pump or wiped out with rags.

It is a further object of this invention to provide an improved liner for a filter cartridge housing which may be easily cleaned and reused.

It is a still further object of this invention to provide an improved liner for an oil filter housing which greatly decreases the time required for removal and replacement of the filter cartridge.

Finally it is an object to provide a plastic liner for an oil filter of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing, which forms a material part of this disclosure, and in which:

FIGURE 1 is a perspective view of the improved liner;
FIGURE 2 is a sectional view on the line 2—2 of FIGURE 1; and
FIGURE 3 is a sectional view, similar to FIGURE 2, of the complete filter assembly.

With particular reference to FIGURE 3 there is shown a complete filter assembly 10 such as is used in the lubricating system of an internal combustion engine, particularly those adapted for use in automobiles. Assembly 10 consists of a housing 12 having a cylindrical wall and a closed bottom 14 provided centrally thereof with an outlet fitting 16 adapted to be connected in the usual oil line. A tube 18 is suitably connected to bottom 14, in direct communication with outlet 16, and extends above the top of housing 12, as clearly shown. The top of housing 12 is open and is provided with a removable cap 20 which is held in place by a nut 22 threaded on the end of tube 18. Slidably mounted on the tube 18 is a filter cartridge 24 of generally conventional form and this cartridge may consist of top and bottom plate members 26 and 28, respectively, between which is positioned a body of foraminous material 30. Housing 12 is also provided with a side inlet opening 32 through which lubricant is supplied to the filter from the crankcase (not shown) of the internal combustion engine.

I provide a liner generally indicated by the reference numeral 34 in FIGURES 1 and 2. The liner member may be formed from sheet plastic material and must be somewhat resilient for reasons that will appear subsequently. Liner 34 is of generally cup shaped formation and has a cylindrical wall 36 and a bottom wall 38 which conform to the inside of the wall 12 and bottom 14, respectively, of the filter housing. Bottom wall 38 is provided with a centrally disposed, axially apertured expansible neck or upstanding tubular portion 42 which terminates in a bead 44. Side wall 36 is also provided with an opening 46 which must be positioned in alignment with and which can be of substantially the same diameter as the inlet 32 in housing wall 12. A sealing flange 48 extends radially outwardly from the upper open end of liner 34 and is clamped between the cap 20 and the annular edge of the housing 12. The neck 42 is preferably quite resilient and self-closing, and the entire liner 34 is preferably form-retaining to assure its conformation with the inside wall face of the housing 12, the resiliency of the neck 42 permitting its insertion onto the tube 18.

With the filter cartridge 24 in position as shown in FIGURE 3, oil from the crankcase enters the filter housing through the housing inlet opening 32 and the liner opening 46 as shown by arrow 50. Foreign matter and other deleterious substances in the oil are filtered out by the foraminous material 30 and the filtered oil then passes through opening 52 in tube 18 and through outlet 16 of housing 12 as shown by arrow 54 to the inlet side of a circulating pump (not shown). Any sludge which collects outside the cartridge 24 will be retained in the annular space 56 inside the liner 34. Resilient neck 42 tightly grips tube 18 as shown in FIGURE 3 at all times.

To remove the filter cartridge nut 22 is backed off tube 18 and removed together with cap 20. This releases flange 48 of liner 34. By suitably gripping flange 48 liner 34 may be withdrawn from the filter housing together with filter cartridge 24. As the liner is withdrawn, neck 42 will slide up tube 18 thus preventing leakage of oil and sludge. As the flange 42 leaves the upper end of tube 18, it will contract, due to its inherent resiliency, to the position shown in FIGURE 2, thus closing the aperture in the neck 42 and preventing the escape of the oil and sludge. It will be readily apparent that the removal of the liner and enclosed cartridge of the present invention is a relatively clean operation.

The liner may be discarded with the used cartridge or it may be cleaned and reused. In either case a new cartridge is inserted in the liner, the neck 42 stretched over tube 18 and the assembly forced down into position within the filter housing. It is safer procedure, however, to preplace the liner in the housing with the liner opening 46 properly aligned with the housing inlet opening 32, and the bottom wall of the liner forced down onto the bottom 14 of the housing 12, before the cartridge is inserted. Cap 20 and nut 22 are then applied and fastened to secure flange 48 in sealing engagement between the cap and annular rim of the housing as shown in FIGURE 3.

It is understood that minor variation from the form of the invention disclosed herein may be made without departure from the spirit and scope of the invention, and that the specification and drawing are to be considered as merely illustrative rather than limiting.

I claim:

1. In an oil filter having an open topped housing, a side inlet and an outlet in said housing, a filter cartridge having a central opening and positioned in said housing, a central tube extending through said central opening and communicating with said outlet in said housing, a cover for said housing secured to said central tube, the combination therewith of a liner enclosing the sides and the bottom of said filter cartridge and conforming with the entire interior of said housing, and having an inlet opening positioned to register with said side inlet of the housing and an inwardly extending axially apertured, expansible neck closely embracing said central tube, said neck being resilient and normally self-closing, so that the neck is closed when the liner is lifted from the housing thus retaining accumulated sludge.

2. The combination of an internal combustion engine oil filter housing having a side inlet opening and an axial outlet;
an apertured tube fixed axially of said housing and communicating with said outlet;
a filter cartridge in said housing and supported on said tube;
a housing liner entirely surrounding sides and bottom of said cartridge and conforming generally with the interior of said housing;
said liner having a side inlet opening aligned with said side inlet opening of the housng; and
said liner having an axially apertured, expansible neck tightly embracing said tube, said neck being resilient and normally self-closing, so that the neck is closed when the liner is lifted from the housing thus retaining accumulated sludge.

References Cited
UNITED STATES PATENTS

| | | | |
|---|---|---|---|
| 991,725 | 5/1911 | Kennedy | 222—490 X |
| 2,053,892 | 9/1936 | Beck | 222—490 X |
| 2,342,948 | 2/1944 | Long | 210—312 |
| 3,104,225 | 9/1963 | Di Benedetto | 220—63 X |
| 3,145,173 | 8/1964 | Sharples. | |

REUBEN FRIEDMAN, *Primary Examiner.*

F. MEDLEY, *Assistant Examiner.*